(12) United States Patent
Serrat et al.

(10) Patent No.: US 11,071,991 B2
(45) Date of Patent: *Jul. 27, 2021

(54) WEED CONTROL SYSTEMS AND METHODS, AND AGRICULTURAL SPRAYER INCORPORATING SAME

(71) Applicant: BILBERRY SAS, Gentilly (FR)

(72) Inventors: Hugo Serrat, Saintcloud (FR); Jules Beguerie, Massy (FR); Guillaume Jourdain, Antony (FR)

(73) Assignee: BILBERRY SAS, Gentilly (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/482,735

(22) PCT Filed: Feb. 6, 2018

(86) PCT No.: PCT/IB2018/050731
§ 371 (c)(1),
(2) Date: Aug. 1, 2019

(87) PCT Pub. No.: WO2018/142371
PCT Pub. Date: Aug. 9, 2018

(65) Prior Publication Data
US 2020/0230633 A1 Jul. 23, 2020

(30) Foreign Application Priority Data

Feb. 6, 2017 (EP) ..................................... 17305131

(51) Int. Cl.
*B05B 12/12* (2006.01)
*G06T 7/70* (2017.01)
(Continued)

(52) U.S. Cl.
CPC ........... *B05B 12/12* (2013.01); *A01M 7/0089* (2013.01); *G06K 9/00791* (2013.01);
(Continued)

(58) Field of Classification Search
CPC .... B05B 12/12; A01M 7/0089; G06K 9/6232; G06K 9/00986; G06K 9/6256;
(Continued)

(56) References Cited

U.S. PATENT DOCUMENTS

| | | | |
|---|---|---|---|
| 4,015,366 A | 4/1977 | Hall, III | |
| 5,246,164 A * | 9/1993 | McCann | A01B 79/005 239/11 |

(Continued)

FOREIGN PATENT DOCUMENTS

| | | | | |
|---|---|---|---|---|
| DE | 102015111889 A1 | 1/2017 | | |
| EP | 1521885 A1 * | 4/2005 | ............. | E01H 11/00 |

(Continued)

OTHER PUBLICATIONS

Carsen et al. Extracting Curvilinear Structures: A Different Geometric Approach, Computer Vision ECCV '96, Spring Berlin Heidelberg, pp. 630-641 (Year: 1996).*

(Continued)

*Primary Examiner* — John B Strege
(74) *Attorney, Agent, or Firm* — Leason Ellis LLP

(57) ABSTRACT

A weed control system (2) for an agricultural sprayer (1) comprising a camera (3) and a spraying unit (4) with several supply modules, a nozzle (9) and a controller module to receive a weed species detection signal and to control the spraying of chemical agent. The weed control system (2) also comprises a weed species identification unit (5) with a communication module, a memory module and a processing module having several parallel processing cores. Each parallel processing core performs a convolution operation between a sub-matrix constructed from nearby pixels of the image and a predefined kernel stored in the memory module to obtain a feature representation sub-matrix of the pixel values of the image. The processing module computes a probability of presence of a weed species from the feature representation matrix and generates a weed species detection signal.

15 Claims, 4 Drawing Sheets

(51) Int. Cl.
  *A01M 7/00* (2006.01)
  *G06K 9/00* (2006.01)
  *G06K 9/62* (2006.01)
  *G06K 9/78* (2006.01)
  *H04N 5/225* (2006.01)

(52) U.S. Cl.
  CPC ......... *G06K 9/00986* (2013.01); *G06K 9/627* (2013.01); *G06K 9/6232* (2013.01); *G06K 9/6256* (2013.01); *G06K 9/78* (2013.01); *G06T 7/70* (2017.01); *H04N 5/2253* (2013.01); *G06K 9/00657* (2013.01); *G06T 2207/20056* (2013.01); *G06T 2207/20076* (2013.01); *G06T 2207/20081* (2013.01); *G06T 2207/30188* (2013.01); *G06T 2207/30252* (2013.01)

(58) Field of Classification Search
  CPC ...... G06K 9/627; G06K 9/78; G06K 9/00791; H04N 5/2253; G06T 7/70; G06T 2207/30188; G06T 2207/20081; G06T 2207/30252; G06T 2207/20076; G06T 2207/20056
  See application file for complete search history.

(56) References Cited

U.S. PATENT DOCUMENTS

| | | | | |
|---|---|---|---|---|
| 5,278,423 A * | 1/1994 | Wangler | ............. | A01M 7/0089 250/559.4 |
| 6,389,785 B1 * | 5/2002 | Diekhans | ............. | A01B 69/001 172/4.5 |
| 7,263,210 B2 * | 8/2007 | Kummel | ............. | A01M 7/0089 382/110 |
| 7,463,751 B2 * | 12/2008 | Farina | ............. | G01N 21/47 239/692 |
| 8,437,498 B2 * | 5/2013 | Malsam | ............. | A01G 25/16 239/71 |
| 2009/0226036 A1 * | 9/2009 | Gaal | ............. | G06K 9/00697 382/103 |
| 2012/0195496 A1 | 8/2012 | Zaman et al. | | |
| 2015/0245565 A1 * | 9/2015 | Pilgrim | ............. | A01C 21/002 280/79.2 |
| 2017/0039425 A1 * | 2/2017 | Itzhaky | ............. | G06K 9/00657 |
| 2017/0223947 A1 * | 8/2017 | Gall | ............. | G01N 21/4738 |
| 2019/0147249 A1 * | 5/2019 | Kiepe | ............. | G06K 9/627 382/110 |

FOREIGN PATENT DOCUMENTS

| | | | | |
|---|---|---|---|---|
| WO | 2013059399 A1 | 4/2013 | | |
| WO | WO-2015181642 A2 * | 12/2015 | ............ | B05B 12/02 |
| WO | 2016025848 A1 | 2/2016 | | |

OTHER PUBLICATIONS

International Preliminary Report on on Patentability in Corresponding PCT Application No. PCT/IB2018/050731 dated Aug. 6, 2019. 7 pages.

International Search Report and Written Opinion in Corresponding PCT Application No. PCT/IB2018/050731 dated Apr. 19, 2018. 12 pages.

* cited by examiner

US 11,071,991 B2

WEED CONTROL SYSTEMS AND METHODS, AND AGRICULTURAL SPRAYER INCORPORATING SAME

CROSS-REFERENCE TO RELATED PATENT APPLICATIONS

This application is a U.S. National Stage Application under 35 U.S.C. § 371 of International Patent Application No. PCT/IB2018/050731, filed Feb. 6, 2018, which claims the benefit of priority under 35 U.S.C. Section 119 of European Patent Application No. 17305131.9 filed Feb. 6, 2017, both of which are incorporated by reference in their entireties. The International Application was published on Aug. 9, 2018, as International Publication No. WO 2018/142371 A1.

FIELD OF THE INVENTION

The instant invention relates to weed control systems for agriculture and farming, in particular agricultural sprayers, and methods for pesticide application in agriculture using such weed control systems and method for calibrating such weed control systems.

BACKGROUND OF THE INVENTION

In particular, the instant invention relates to weed control systems for agriculture and farming, in particular agricultural sprayers.

Chemical methods for weed control often involve the application of a weed-control agent such as an herbicide or bioherbicide. Agricultural crop pesticides can either be applied pre-emergent or post-emergent with regard to the germination status of the plant and help to reduce competitive pressure on newly germinated plants by removing undesirable organisms and maximizing the amount of water, soil nutrients, and sunlight available for the crop.

In agriculture large scale and systematic procedures for pesticide application are usually required and performed by large equipments known as sprayers mounted on or dragged by tractor.

A sprayer commonly comprises at least one boom with nozzles at intervals along the boom, a tank to contain the water and chemical mix and a pump to distribute the herbicide to the nozzles through pipes. Sprayers come in several types either self-propelled, trailed by a tractor, mounted on a tractor or de-mountable (mounted on a tool carrier of the tractor for instance).

To reduce environmental impact as well as the cost of the weed control operation, there has been recent developments of vision guided tractor which are provided with optical sensors, for instance color images to guide band spraying equipments. The spraying system of the tractors or the mechanical cultivation devices are then controlled to only treat a weed plant when it is detected on the ground.

Commonly used guidance technology take advantage of the known pattern in which a crop was planted to distinguish between crops and weed plants. Color images are for instance transformed in grey level images so that green plant appears bright against a dark soil background. The plant/row spacing is entered into the computer and a predefined planting pattern can be matched with the grey level image during the movement of the tractor. The randomly distributed weed is then identified as green area lying outside of the regular crop pattern.

However, such systems present several drawbacks.

First, the crop pattern is often irregular or can evolve over the crop field in such a way that a predefined plant/row spacing entered at the beginning of the operation become irrelevant. There may also be too few crop rows (for instance if there is a high ratio of missing crop) or too many weeds in an image to reliably match the crop pattern. Such systems are also not capable of using different selective herbicides for different weed species.

There has been attempts to combine such systems with spectrum analysis of the emission light of the weed or shape recognition algorithms that compares the shape of the observed weed with shapes stored in a weed database.

Such systems present several disadvantages that prevent their uses in practice.

First, while the spectrum of emission light of the weed can be characterized in laboratory condition, the spectral reflectance of plants varies strongly in natural condition depending on weed species and soil variations. Naturally occurring weeds present a great diversity of species which can differ greatly from industrially grown weed. Soil composition also has a strong effect on the color of the weeds and its spectral reflectance. As a result, the spectrum of emission light of the weed can usually not be used as a reliable criterion to distinguish between weed species.

Second, given the great diversity of weed species, a weed shapes database has to be very large to store all different shapes variations (shapes of young weeds, of old weeds, of every sub-species . . . ). Shape recognition algorithms that compare the shape of the observed weed with shapes stored in weed shapes database are thus very slow as they have to scan through these large databases.

Third, the spectrum analysis of the emission light of the weed requires a brightness level that makes the use of such systems difficult when the brightness is low, especially at dawn, at dusk or even at night when it might be desirable to apply certain types of treatments. The low level of brightness and the speed of the sprayer induce a noise problem when detecting the green color, which has a negative impact on the sharpness of the acquired images and the processes that can be applied based on the acquired images.

As a consequence, the sprayers can only travel at a very low speed to give enough time for the weed identification algorithm to process the images acquired by the camera and identify the weed species.

Document WO2016025848A1 discloses a control system for agriculture and farming, specifically intended to perform a stand count of crop such as corn.

This reference mentions on a few occasions weed detection, but does not teach any approach to weed species detection or weed identification. In addition, the detecting means disclosed in this document are based on plant spectral response in the visible or near-infrared range.

Moreover, document WO2013059399A1 cited in the above reference merely discloses additional details about the above-mention spectral detection.

There is thus a need for a weed control system that would be able to identify weed species at a higher speed and with a greater accuracy and would allow real-time spray control for selective weed treatment even in difficult conditions such as high sprayer speed and adverse lighting, and even for identifying small-size weed located in the most remote portion of the images (top part of the image with an inclined viewing axis).

SUMMARY OF THE INVENTION

To this aim, according to the invention, such a weed control system for an agricultural sprayer comprises:
  at least one camera adapted to be mounted on an agricultural sprayer (1) to acquire an image of a portion of a crop field while said agricultural sprayer is travelling on a crop field, said image comprising a matrix of pixel values, a spraying unit adapted to be mounted on said agricultural sprayer and comprising at least one supply module comprising a chemical agent tank, at least one nozzle to spray a chemical agent from said at least one supply module, and a controller module adapted to receive a weed species detection signal and to selectively control the spraying of chemical agent from said at least one supply module though said at least one nozzle on the basis of said weed species detection signal, the weed control system being characterized in that it further comprises:

a weed species identification unit comprising a communication module adapted to receive the image acquired by the camera and to send a weed species detection signal to a controller module of a spraying unit of the weed control system, a memory module adapted to store said image, and a processing module comprising a plurality of parallel processing cores, each parallel processing core being adapted to perform at least one convolution operation between a sub-matrix constructed from nearby pixels of the image and a predefined kernel of reference pixel images stored in the memory module to obtain a feature representation sub-matrix of the pixel values of the image, the processing module being adapted to compute at least one probability of presence of a weed species among a database of weed species from a feature representation matrix of the image constructed from the feature representation sub-matrices constructed by the parallel processing cores, and to generate a weed species detection signal on the basis of said at least one probability of presence.

Thanks to the invention, several features can be taken into account at once in the recognition of weed species such as for example the shape, the texture, the color and/or the location of the weed species in the images, thanks to an implementation of artificial intelligence processing involving kernels.

Further optional and non-limiting features of the invention comprise the following:

a target zone of the spraying unit and a field of view of the camera are separated from one another by a separation distance $d_s$ along a longitudinal axis of the agricultural sprayer, wherein the number of processing cores of the weed species identification unit is such that a weed species detection signal can be generated from an image acquired by the camera with a latency time value $t_l$ such that:

$$d_s/(t_l-t_p)>v$$

where v is a speed value of the agricultural sprayer travelling on the crop field and $t_p$ is a processing time value of the spraying unit.

the camera has a longitudinal extension of the field of view $FOV_X$ along a longitudinal axis of the agricultural sprayer selected so that a weed species detection signal can be generated from an image acquired by the camera with a latency time $t_l$, such that:

$$FOV_X/t_l>v$$

where v is a speed of the agricultural sprayer (1) travelling on the crop field.

the camera definition and the camera position on the agricultural sprayer are selected such that each pixel of an image generated by said camera independently covers an elementary area of the ground area of less than five square millimetres.

each parallel processing core performs said at least one convolution operation by computing a matrix to matrix multiplication between the sub-matrix and a predefined kernel matrix, or by computing a Fast-Fourier-Transform of the sub-matrix, and wherein the parallel processing cores perform convolutions or Fast-Fourier-Transforms based on a given camera image at the same time.

the parallel processing cores of the processing module are adapted to perform a pooling operation of the feature representation matrix of the image comprising determining a statistic of a sub-matrix of nearby values of said feature representation matrix, in particular a maximum of said sub-matrix of nearby values.

the parallel processing cores of the processing module are adapted to perform a non-linear parallel processing of the feature representation matrix of the image by applying a non-linear operation to each value of said feature representation matrix, such as a rectified linear activation function.

the processing module is adapted to perform a sequence of n processing operations starting from an input matrix generated from the pixel values of the image and ending with an output matrix comprising at least one probability of presence of a weed species among a database of weed species, in particular wherein each processing operation i of said sequence of successive processing operations takes as input a feature representation matrix $F_{i-1}$ outputted by a preceding processing operation i−1 or an input matrix generated from the pixel values of the image, and generates a feature representation matrix $F_i$.

the weed species detection signal comprises a weed species location indicator, in particular wherein the output matrix comprises at least one value indicative of a location of a weed species among the database of weed species inside the image acquired by the camera.

a location of the weed species determined from the weed species location indicator is stored the memory module.

the spraying unit comprises a plurality of nozzles arranged along a transversal direction of the agricultural sprayer, and wherein the controller module of the spraying unit is adapted to receive the weed species detection signal and to further control the spraying of chemical agent through the plurality of nozzles based on the weed species location indicator.

the spraying unit comprises at least one movable nozzle adapted to selectively spray a plurality of target zones along a transversal direction of the agricultural sprayer, and wherein the controller module of the spraying unit is adapted to receive the weed species detection signal and to further control a position and/or orientation of the movable nozzle based on the weed species location indicator.

The present invention further provides an agricultural sprayer comprising a weed control system according as defined above mounted on said agricultural sprayer.

According to another aspect, the present invention provides a method for weed control using an agricultural sprayer as defined above, comprising:

acquiring an image of a portion of a crop field while said agricultural sprayer is travelling on a crop field, using at least one camera mounted on the agricultural sprayer, said image comprising a matrix of pixel values, receiving the image acquired by the camera in a communication module of a weed species identification unit of the agricultural sprayer and storing said image in a memory module of said weed species identification unit, performing in parallel, in a plurality of respective parallel processing cores of a processing module, a plurality of respective convolution operations, each convolution operation being performed between a sub-matrix constructed from nearby pixels of the image and a predefined kernel stored in the memory module to obtain a feature representation sub-matrix of the pixel values of the image, computing at least one probability of presence of a weed species among a database of weed species from a feature representation matrix of the image constructed from the feature representation sub-matrices constructed by the parallel processing cores, generating a weed species detection signal on the basis of said at least one probability of presence a weed species and sending said weed species detection signal to a controller module of a spraying unit of the weed control system, receiving the weed species detection signal in a controller module of a spraying unit mounted on the agricultural sprayer, and selectively controlling the spraying of chemical agent from at least one supply modules of the spraying unit though at least one nozzle on the basis of the weed species detection signal.

Finally, the present invention provides a method for calibrating a weed control system as defined above and adapted to spray a plurality of weed species listed in a database of weed species, wherein a vehicle is provided with at least one camera adapted to acquire an image of a portion of a crop field, during a movement of said vehicle on a crop field, said image comprising a matrix of pixel values, said vehicle travels a crop field presenting at least a predefined number of each weed species of a database of target weed species, and acquires at least a predefined number of images of each weed species of said database of target weed species, a training dataset is constructed from said predefined number of images of each weed species by tagging said weed species on said images, a set of weed identification model weights is determined from the training dataset, said set comprising at least one predefined kernel for a convolution operation performed by a parallel processing core of a weed control system as defined above, the set of weed identification model weights is stored in a memory module of a weed control system as defined above.

BRIEF DESCRIPTION OF THE DRAWINGS

Other features, aims and advantages of the invention will readily appear from the following description of several of its embodiments, provided as non-limitative examples, and of the accompanying drawings.

On the drawings.

In the different figures, the same reference signs designate like or similar elements.

DETAILED DESCRIPTION

Figure 1:
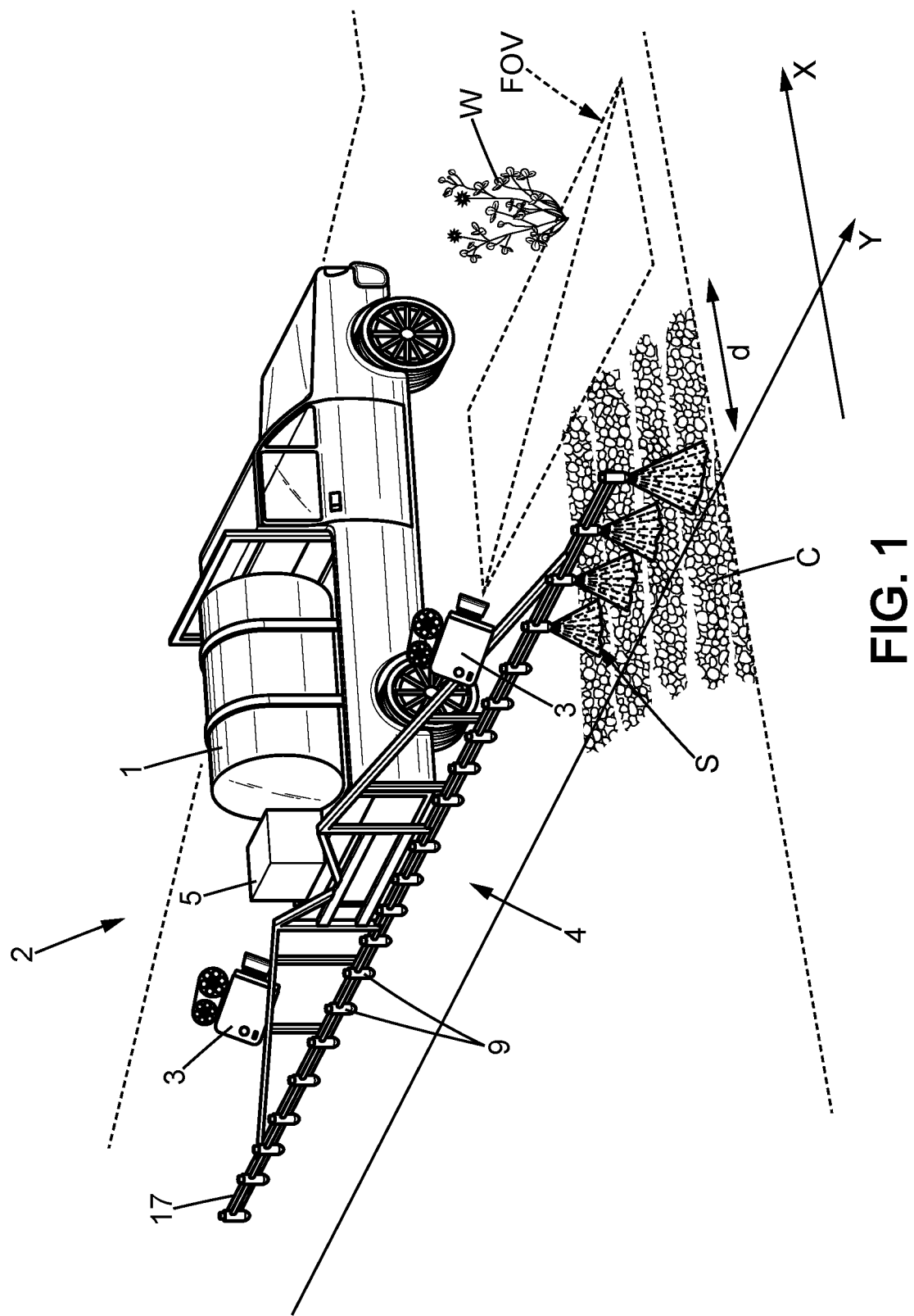
FIG. 1 is a schematic perspective view of an agricultural sprayer comprising a weed control system according to an embodiment of the invention.

FIG. 1 illustrates an example of agricultural sprayer 1 according to the invention.

The agricultural sprayer 1 is designed to travel on a crop field. In particular, the agricultural sprayer 1 can be mounted on or dragged by a tractor. The sprayer can be either self-propelled, trailed by a tractor, mounted on a tractor or de-mountable (fitted a too carrier for instance).

A crop field is illustrated on FIG. 1 and usually present crops C which may be organized along rows and may be visible or not (pre-emergent crops for instance). A variety of weed plants W may also grow in the field as illustrated on FIG. 1.

The agricultural sprayer 1 is designed to travel, along a longitudinal direction X on the crop field usually along one or several row of crops in the field. The agricultural sprayer 1 comprises at least one boom 17 extending along a transversal direction Y perpendicular to the longitudinal direction X.

Figure 2:
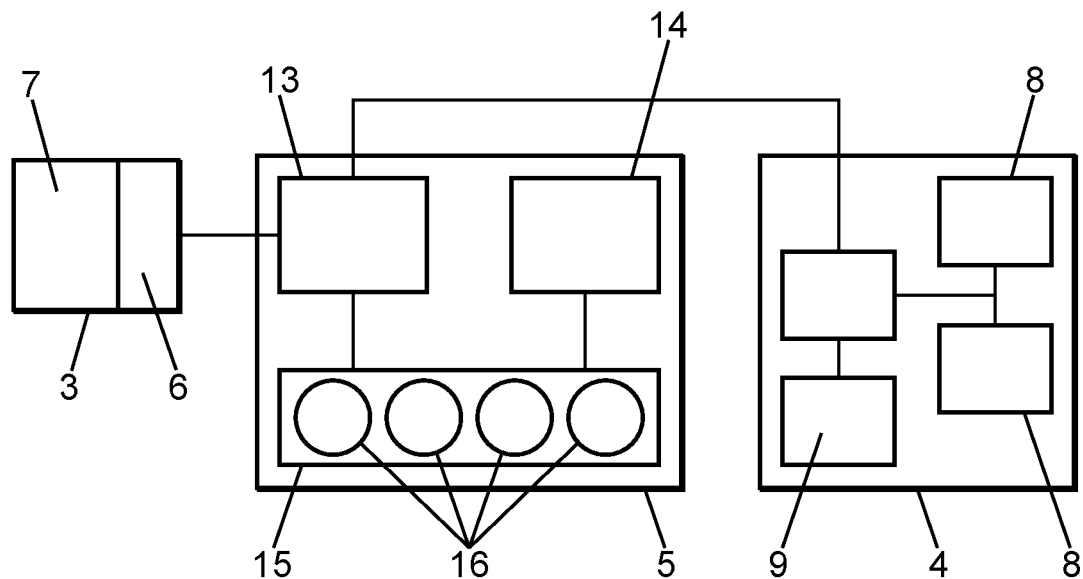
FIG. 2 is a block-diagram illustrating the modules and units of the weed control system of FIG. 1, FIGS. 3 and 4 are two flowcharts detailing the processing operations performed by the processing module of a weed species identification unit of the weed control system of FIGS. 1 and 2.

The agricultural sprayer 1 is provided with a weed control system 2 according to the invention, which is illustrated schematically on FIG. 2.

More precisely, the weed control system 2 comprises one or several camera(s) 3, a spraying unit 4 and a weed species identification unit 5.

Cameras 3 are mounted on the agricultural sprayer 1, for instance on the boom of the agricultural sprayer, and are adapted to acquire images of a portion of the crop field while the agricultural sprayer 1 is travelling on the field. The camera can be mounted with a given angle with regard to a vertical direction perpendicular to the transversal and longitudinal direction, for instance about 45 or 60 degrees, in order to acquire an image of the crop field in front of the agricultural sprayer. The cameras 3 can be mounted on shock absorbers in order to reduce the vibrations during movements of the sprayer 1 and to increase the sharpness of the acquired images. As it will be explained hereafter, several features can be taken into account in the recognition of weed species, including the shape, the texture, the color and/or the location of the weed species in the images. The sharpness of the acquired images is also important to obtain such information, esp. despite the light being low and the sprayer speed is fast. Several criteria may therefore be necessary to recognize a wide variety of weed species, and the present invention allows for this.

Each camera 3 comprises a sensor 6, such as a CCD or CMOS sensor, and an optical system 7 comprising a plurality of lenses and/or mirrors.

A camera 3 acquires an image comprising a matrix of pixel values. Each image comprise W*H pixels where W is the number of pixels along a width of the image and H is a number of pixels along a height of the image. The width W and the height H of the camera define a resolution of the sensor of the camera. The sensor can in particular acquire image comprising matrix of at least one million pixel values, more preferably over 5 million pixel values.

Alternatively, a linear camera can be used and a matrix of pixel values can be reconstructed from the output of the linear camera.

Advantageously, the location of the camera, the resolution of the sensor and the design of the optical system are selected so that the image acquired by the camera comprises a matrix of at least one million pixel values wherein each pixel of said matrix independently covers an area of the ground of less than five square millimetres, preferably less than two square millimetres. Such a spatial resolution of the camera is important for making possible to reliably identify the weed species as detailed further below.

The camera 3 can be a color camera. In this case, the pixel values each comprises for instance three channel such as RGB (red-green-blue) values and the matrix of pixel values is a 3D matrix of dimensions W*H*3 for instance.

In contrast to the previously known weed control systems, the camera 3 may be free of color filters and polarizer. In particular, the optical system 7 of the camera 3 may be constituted only by lenses and/or mirrors. Since only the general color and no absolute spectral information is needed to identify the weed, a bare camera can be used and only provided with selected lenses and mirrors to obtain the spatial resolution necessary for weed species identification.

A spraying unit 4 is also mounted on the agricultural sprayer 1 and comprises several components that will now be described in greater details.

As illustrated on FIG. 2, the spraying unit 4 comprises at least one supply module 8 at least one nozzle 9 and a controller module 10. In particular the spraying unit 4 may comprise at least two supply modules 8 containing different chemicals.

Each supply module 8 comprises a chemical agent tank 11 and an electronic delivery valve 12.

The chemical agent tank 11 contains a liquid that can be an herbicide or water.

The tank can contain a premix of water and herbicide or a separate tank of water can contain water to be mixed with an herbicide on the fly, during or just prior to the delivery. Each supply module 8 can be provided with a tank 11 containing different liquid. For instance, one supply module 8 can be provided with a tank 11 containing an herbicide containing an active agent adapted for weeding treatment before sprouting of weeds, while another supply module 8 can be provided with a tank 11 containing an herbicide with an active agents adapted for weeding treatment after the sprouting of weeds.

The spraying unit 4 comprises at least one nozzle 9 to spray a chemical agent from at least one of said supply modules 8 on a target zone S of the field.

The nozzles are mounted on the agricultural sprayer, for example spread along the transversal direction of extension of the agricultural sprayer as illustrated on FIG. 1.

The controller module 10 of the spraying unit 4 receives a weed species detection signal from the weed species identification unit 5 as it will be described further below. On the basis of this signal, the controller module 10 selectively controls the spraying of chemical agent from at least one of the supply modules 8 through the nozzle 9.

The controller module 10 may control the spraying of chemical agent with a spraying delay after the reception of the weed species detection signal. The spraying delay may be computed on the basis of a latency time of the weed recognition unit as well as a speed of the vehicle 1 and a calibrated distance between the nozzle 9 and the camera 3.

The spraying delay may also take into account a pre-calibrated time of delivery of the chemical agent corresponding to the latency of the mechanical systems of the spraying unit and the time of displacement of the liquid in the tubes of the spraying unit for instance.

In one embodiment of the invention, the weed species detection signal only comprises information regarding the weed species. The controller module 10 of the spraying unit 4 will then select a supply module 8 containing an adapted herbicide for this weed species and control the electronic delivery valve 12, and if needed the nozzle 9, to spray the chemical agent.

In other embodiments of the invention, the weed species detection signal may comprise a weed species location indicator.

In such embodiment, a location of the weed species on the field may be determined from said weed species location indicator, for instance by using additional information on the location of the sprayer 1 obtained by using a global positioning system and, optionally, additional calibration information on the orientation and/or position of the camera 3 on the sprayer 1.

The location of the weed species on the field may then be stored in a memory, in particular in the memory module 14.

In one of these embodiments illustrated on the figures, the spraying unit 4 comprise a plurality of nozzles 9 arranged along the transversal direction Y of extension the agricultural sprayer. The nozzles 9 are directed toward the field and each nozzle 9 is adapted to spray chemical to cover a target zone S of the field.

In this embodiment, the controller module 10 of the spraying unit 4 may then receive the weed species detection signal and control the spraying of chemical agent through the plurality of nozzles 9 based on the weed species location indicator. In particular, only a restricted number of nozzles 9 may be open in accordance with the location of the weed on the ground.

In a variant, the spraying unit 4 may comprise at least one movable nozzle 9. The movable nozzle may be adapted to selectively spray a plurality of target zones S on the ground, for instance a plurality of target zone S juxtaposed along the transversal direction Y of the agricultural sprayer 1. The movable nozzle 9 may have its position and/or orientation controlled by a tilting or sliding control unit.

In this embodiment, the controller module 10 of the spraying unit 4 receives the weed species detection signal and controls the position and/or the orientation of the movable nozzle 9 based on the weed species location indicator. In particular, the position and/or orientation of the nozzle 9 may be adapted in accordance with the location of the weed on the ground in order to spray herbicide on the correct location on the ground.

The two embodiments described above can be combined in order to provide a plurality of movable nozzle independently moved and selected.

We now refer more specifically to FIG. 2 which illustrates in greater detail a weed species identification unit 5 according to an embodiment of the invention.

The weed species identification unit 5 comprises a communication module 13, a memory module 14 and a processing module 15.

The communication module 13 receives the image acquired by the camera 3 and sends the weed species detection signals to the controller module 10 of the spraying unit 4 of the weed control system 2 as it was already described before.

In particular, the camera 3 may generate a continuous stream of images during the movement of the agricultural sprayer 1 on the crop field, in which case the communication module 13 may continuously receive said images and all the modules of the weed species identification unit 5 may be operating in real-time or soft-real-time thus also generating and sending a continuous stream of weed species detection signals to the controller module 10 of the spraying unit 4.

The communication module 13 may communicate with the camera 3 and the controller module 10 of the spraying unit 4 by wired communication or using a wireless protocol (e.g. optical or radio protocol such as infra-red or "Wi-Fi").

The memory module 14 is capable of storing the received image or stream of images. The memory module 14 may comprise several sub-modules and may be distributed in several chips of the weed species identification unit 5. In particular, the memory module 14 may comprise a non-volatile storage memory and a volatile storage memory.

The processing module 15 comprises a plurality of p parallel processing cores 16. The number p of parallel processing cores 16 is greater than one. The processing module may for instance comprise at least four parallel processing cores 16. The parallel processing cores 16 can run parallel computations on different sub-matrices and kernels as it will be described in greater detail further below.

Each parallel processing core 16 may comprise a plurality of sub-core processors in order to further parallelize the processing of the image.

In particular, the parallel processing cores may be part of a single computing component 15, for instance a central processing unit (CPU) or a graphical processing unit (GPU).

The parallel processing core 16 may have access to specific area of the memory module 14, in particular, the memory module 14 may include a memory chip located close to the processing module 15, for instance a memory chip of a graphical processing unit incorporating the processing module 15.

A basic operation of a processing core 16 is a convolution operation between a given sub-matrix P constructed from nearby pixels of the image and a predefined kernel K stored in the memory module 14, to obtain a feature representation sub-matrix F of the pixel values of the image. For instance, the pixel dimensions of each sub-matrix of nearby pixels of the image are selected to be identical to the dimensions of the predefined stored kernel K.

The kernel K is a small matrix that can be considered as an equivalent receptive field for a given pixel in the image.

The convolution operation involves computing the dot product between the entries of the kernel K and a sub-matrix P constructed from nearby pixels of the image to produce a feature representation sub-matrix, which is a filtered representation of the image.

As previously explained, a sub-matrix P of the image contains nearby pixels of this image. Each image can therefore be divided into several sub-matrices P so that the dot product computed between the kernel K and each sub-matrix P can typically generate respective several feature representation sub-matrices. It is then possible to construct a feature representation matrix from these feature representation sub-matrices.

Given the locality of the convolution operation, the convolutions can be easily parallelized in a multicore hardware environment, which strongly accelerates the processing of the image.

Moreover, as detailed further below, the coefficients of a kernel can be calibrated so that the kernel is general and can be applied to a wide variety of weed species. The determination of the coefficients of the kernel is part of the determination of the weed identification model weights. It means that the convolution operation performed with the kernel K should allow to recognize each weed species. The coefficients of the kernel are therefore representative of features characterizing each weed species.

To distinguish between different weed species, several features may be taken into account alone or in combination like the shape, the texture, the color and/or the location of the weed species in the images. The coefficients kernel must thus be calibrated according to these parameters or features. By taking into account a sufficient number of features distinguishing the different weed species, the effectiveness of the recognition of weed species and the speed of said recognition are improved. This is particularly advantageous to allow the sprayer to travel faster and reduce the overall treatment time.

In particular, to perform said convolution operation, each parallel processing core may compute a matrix to matrix multiplication between the sub-matrix P and a predefined kernel matrix K associated to the kernel.

The coefficients of the kernel matrix K can be identical across the image and thus identical between the parallel processing cores or can vary depending on the location of the processed sub-matrix in the image.

This matrix to matrix multiplication can be parallelized by using conventional parallel processing algebra algorithms to increase the speed of processing of the image.

Alternatively, the convolution operation may be performed by computing a Fast Fourier Transform of the sub-matrix P of the image.

Figure 3:
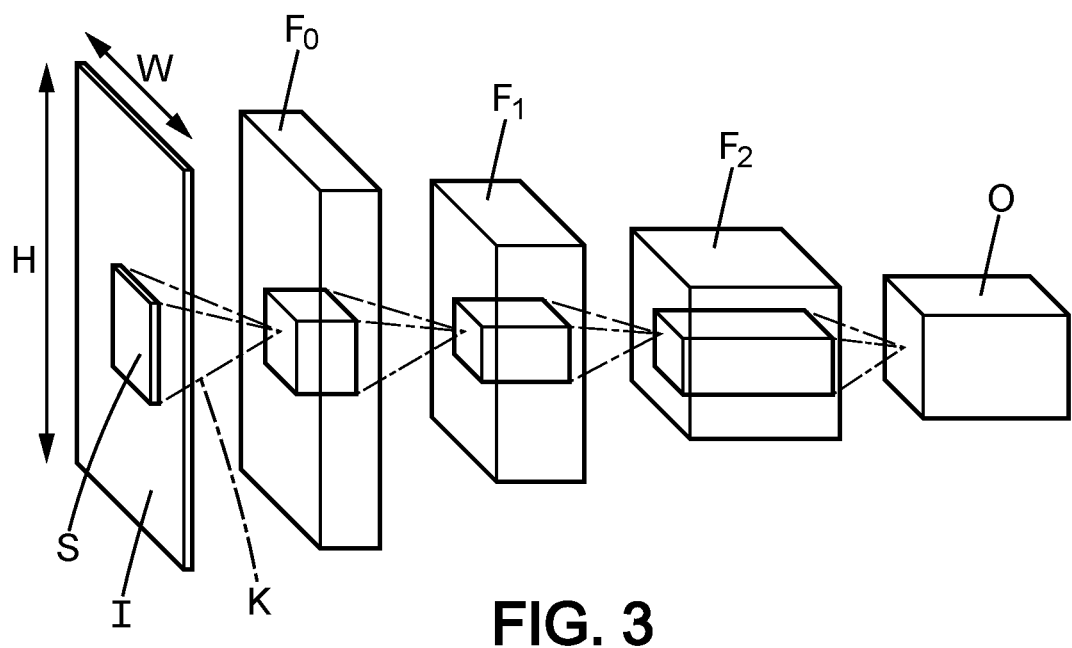
Figure 4:
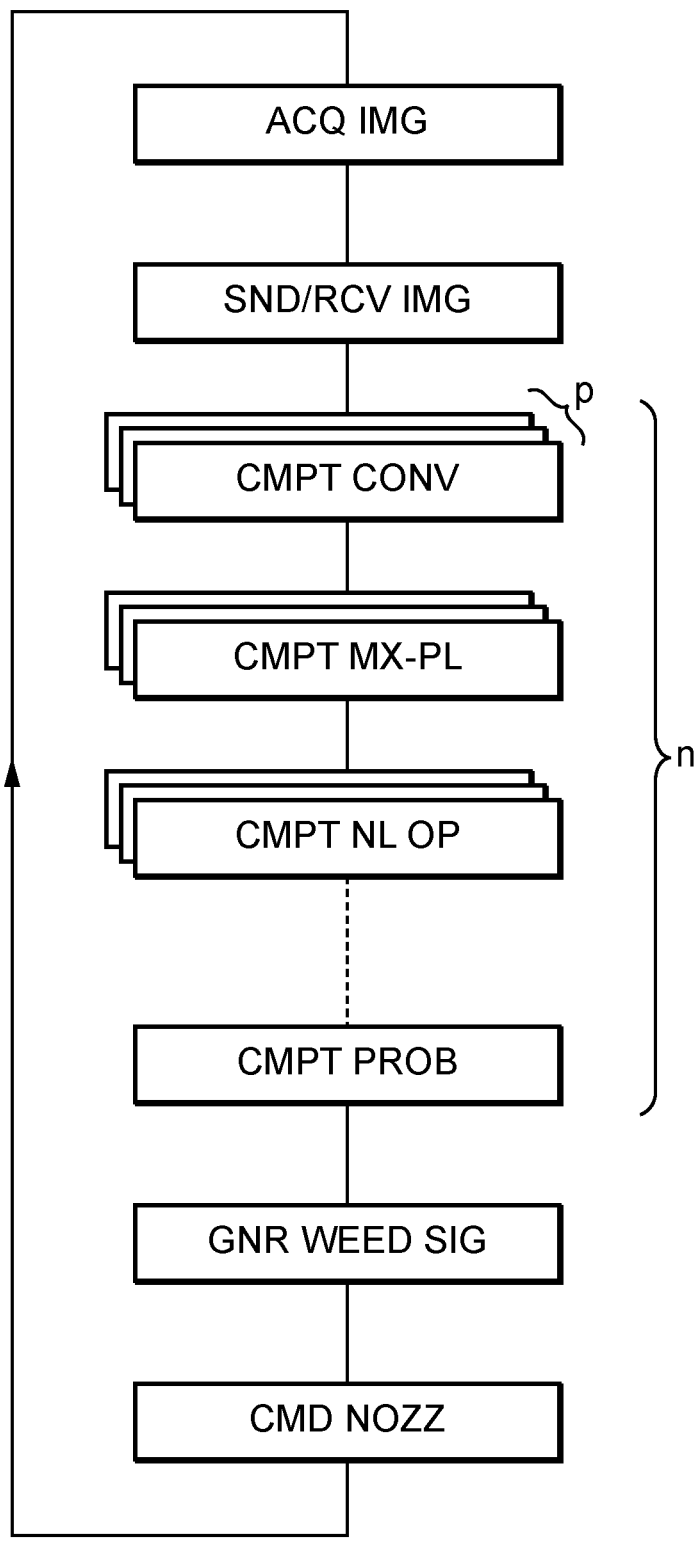

As illustrated in FIGS. 3 and 4, the processing module usually performs a sequence of n processing operations starting from an input matrix I generated from the pixel values of the image and ending with an output matrix O comprising at least one probability of presence of a weed species among a database of weed species.

Advantageously, each processing operation i of said sequence of successive processing operations takes as input a feature representation matrix $F_{i-1}$ outputted by a preceding processing operation i−1 or the input matrix I generated from the pixel values of the image, and generates a feature representation matrix $F_i$.

The processing operations involve at least one of:
a convolution operation as described before,
a pooling operation, and/or
a non-linear parallel processing.

The pooling operation and the non-linear parallel processing will now be described in further details.

A pooling operation can be performed by each parallel processing core of the processing module.

A pooling operation involve can be performed on a sub-matrix S of nearby values determined from the input matrix I or from a feature representation matrix $F_{i-1}$ outputted by a preceding processing operation i−1.

A feature representation matrix $F_i$ can be constructed from the feature representation sub-matrices obtained by applying a convolution operation between the kernel K and sub-matrices P of the input matrix I or of the feature representation matrix $F_{i-1}$. Likewise, the feature representation matrix $F_i$ can be divided into several sub-matrices S of nearby values. Similarly, the input matrix I can be divided into several sub-matrices S of nearby values.

A pooling operation can be applied on each sub-matrix S of nearby values. It is for instance possible to take the feature representation sub-matrices as sub-matrices S of nearby values when the pooling operation is applied to a feature representation matrix.

The pooling operation is a local operation of reducing the size of a feature representation matrix $F_{i-1}$ or of the input matrix I by preserving the most important information. For instance, for each sub-matrix S of nearby values, only one value is retained. In other words, after applying the pooling operation, a feature representation matrix $F_i$ with a reduced size is obtained so that the said feature representation matrix $F_i$ only contains, for instance, one value for each sub-matrix S of the feature representation matrix $F_{i-1}$ or of the input matrix I.

The pooling operation involves determining a statistic of said sub-matrix S of nearby values. The statistic is for instance a maximum of said sub-matrix S, as in the so-called "max-pooling". In the embodiment in which a max-pooling operation is used, only the maximum value of each sub-matrix S is retained.

Since the pooling operation is a local operation, it can also be easily parallelized and increase the robustness of the weed species identification with regard to a small shift of the weed plant in the image between the training images and the test images.

The parallel processing cores of the processing module are also capable of performing a non-linear parallel processing of the input matrix I or of a feature representation matrix $F_{i-1}$ outputted by a preceding processing operation i–1.

By "non-linear operation", it is meant that the output y=f(x) of the non-linear function f applied to a scalar, vector or tensor x is not linear with respect to said scalar, vector or tensor x.

One example of non-linear function is a rectified linear unit such as the function f(x)=max(0, x) or a generalized rectified linear unit such as a leaky rectified linear unit, a parametric rectified linear unit or a maxout unit. For instance, the generalized function may be:

$$f(x)=\max(0,x)+a*\min(0,x)$$

where a is a predefined parameter.

The non-linear function can be independently applied to each value of the input matrix I or the feature representation matrix $F_{i-1}$.

Unlike the pooling operation, the non-linear operation can preserve the size of the input matrix I or of the feature representation matrix $F_{i-1}$.

Here again, the independent application of the non-linear function to each value of the input matrix I or the feature representation matrix $F_{i-1}$ makes the processing easily parallelized and thus reduces the latency of the weed identification unit.

The successive processing operation may thus lead to an output matrix containing probabilities of detecting each weed species in the database of weed species.

In some embodiments of the invention, the output matrix may further comprise at least one value indicative of a location of a weed species inside the image acquired by the camera.

This allows to select and/or move the nozzle to reduce the chemical consumption.

Advantageously, every identified weed species may be provided with a location information.

Such a value indicative of a location of a weed species may for instance be a bounding box indicative of a location of the weed species inside the image acquired by the camera.

From the output matrix, the processing module 15 is thus capable of computing at least one probability of presence of a weed species among the database of weed species.

The processing module 15 may thus generate a weed species detection signal on the basis of said probability of presence.

Using the special operation and parallel processing described above, it is thus possible to obtain a weed identification system with a very low latency.

More precisely, the weed species identification unit 5 may be adapted to generate a weed species detection signal from an image I acquired by the camera 3 with a latency time $t_l$.

The latency time $t_l$ corresponds to a time separating the generation of the weed species detection signal from the reception of the corresponding image I.

The latency time ti may be less than 500 ms, in particular less than 200 ms or even less than 100 ms with a corresponding accuracy of detection over 75%, in particular over 90%.

By accuracy of detection, it is meant the number of detection among the weed species observed in a large number of images, for instance more than 1000 images (i.e. number of true positive over total number of weed specimens appearing on said images).

Moreover, a target zone S of the spraying unit 4, in particular of the nozzle 9 of the spraying unit, and a field of view FOV of the camera 3 may be separated from one another by a separation distance $d_s$ along the longitudinal axis X of travel.

The separation distance $d_s$ and the latency time $t_l$ may be such that $d_s/(t_l+t_p)>v$, where v is a speed of the agricultural sprayer 1 travelling on the crop field and $t_p$ is a processing time of the spraying unit.

The processing time of the spraying unit $t_p$ is the time between the reception in the spraying unit of the information that a weed has been identified and the actual spraying of the herbicide. This time may in particular comprise the delay detailed above. The processing time of the spraying unit $t_p$ is for instance of the order of 200 ms or lower.

In one embodiment, the agricultural sprayer may be travelling on the crop field with a speed v for instance between 7 and 25 km/h. The target zone S of the spraying unit and the field of view FOV of the camera may be located quite close from one another along the longitudinal direction of travel, for instance between 1 and 6 m apart. The latency time ti may thus be around 200 ms for instance.

The latency time $t_l$ may also be constrained by the camera 3 as it will now be described. The acquisition system of the camera 3 has a predefined field of view (FOV). More precisely, the lens focal length and image sensor size sets up a relationship between the field of view and the working distance (the distance between the back of the lens and the imaged portion of the crop field). The field of view FOV is thus the area of the inspection captured by the camera sensor. The size of the field of view and the size of the camera sensor directly affect the image resolution (one determining factor in accuracy). The field of view is in particular limited by the resolution that is required to make it possible to identify the weed species as detailed above The area of the field of view FOV may thus be expressed in square meters and may in particular be less than 10 square meters, for instance around 5 square meter.

The field of view extends along the longitudinal direction X and the transversal direction Y.

The longitudinal extension of the field of view $FOV_X$ may be comprised between 1 m and 3 m. The transversal extension of the field of view $FOV_Y$ may be comprised between 1 m and 5 m.

The latency time may also be constrained by the longitudinal extension of the field of view $FOV_X$ and the frame rate of the camera.

For instance, if the camera has a longitudinal extension of the field of view $FOV_X$ of about 1 meter, the camera has to output a new image every time the agricultural sprayer has travelled 1 meter along the longitudinal direction. In order to prevent the accumulation of image in a buffer, the latency time of the weed species identification unit then has to be less than the time between two consecutive acquisitions of the camera 3.

In particular, a relation can be set between the longitudinal extension of the field of view ($FOV_X$) and the latency time ($t_l$) as follows:

$$FOV_X/t_l > v$$

or equivalently:

$$t_l < FOV_X/v$$

As a matter of example, if the longitudinal extension of the field of view ($FOV_X$) is about 1 meter and the speed (v) about 20 km/h, i.e. 5.5 m/s, the latency time ($t_l$) has to be less than 180 ms.

The parameters of the processing operations described before, in particular the parameters of the kernels of the convolution operations can be determined by operating a calibration process that will now be described in greater details.

A plurality of weed species is listed in a database of weed species. The database of weed species may comprise for instance *Cirsium arvense* Scop, *Chenopodium polyspermum* L., *Bromus sterilis* L., *Papaver rhoeas* L., *Datura stramonium* L, *Avena fatua* L., *Galium aparine* L., *Geranium dissectum* L., *Sonchus oleraceus* L., *Convolvulus arvensis* L., *Matricaria* sp., *Polygonum convolvulus* L., *Veronica hederaefolia* L., *Alopecurus agrestis* L.

A vehicle such as the agricultural sprayer 1 is provided with at least one camera 3 adapted to acquire an image of a portion of a crop field, during a movement of said vehicle on the crop field.

The camera 3 used during the calibration process can be similar to the camera described above.

The vehicle 1 is designed for traveling on a crop field. It may be similar to the agricultural sprayer described above. The vehicle may be provided only with a camera and thus without a spraying unit 4 or a weed species identification unit 5.

The camera 3 acquires images comprising matrices of pixel values as detailed above.

The vehicle 1 travels on a crop field presenting at least a predefined number of each weed species of a database of target weed species. The predefined number is advantageously a large number, for instance larger than a few hundred or a thousand of samples of each target weed species.

Figure 5:
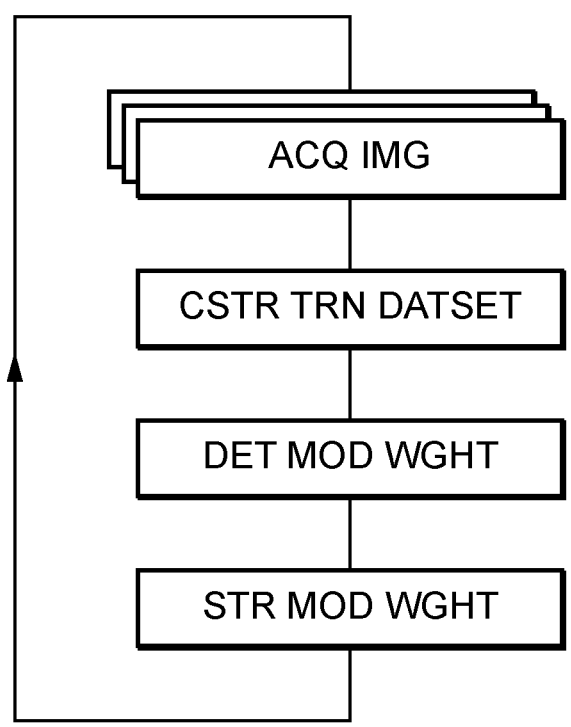
FIG. 5 is a flowchart detailing a step of a method for calibrating the weed control system of FIGS. 1 and 2, according to embodiments of the invention.

The vehicle 1 thus acquires at least a predefined number of images of each weed species of said database of target weed species. For instance, more than a few hundred or a few thousands of images containing a sample of each target weed species. This step of acquiring at least a predefined number of images of weed species is the first step of the process illustrated in FIG. 5.

In a second step, a training dataset can then be constructed from the predefined number of images of each weed species by tagging the weed species in the images. The tagging operation can comprise assigning a category of weed for each sample acquired in the image and can also comprise defining a bounding box or an indication of the location, inside an image, of each weed species shown in said image.

For each category of weed, the system thus can use several samples illustrating said category of weed. It is then possible to determine common features between said samples like the shape, the texture, the color and/or the location of the category of weed. A learning step described below is based on the training dataset and on the tagged weed species to which a category has been assigned.

In other words, from the images on which the different weed species have been indicated, it is possible to determine the distinguishing features that will enable the different weed species to be distinguished from each other. It is therefore not even necessary to indicate on which criteria the weed species will be differentiated, since these criteria can be automatically determined by analysis of images and the determination of common features between several samples tagged as indicating the same weed species.

In a third step, a set of weed identification model weights is then determined from the training dataset. The set of weed identification model weights comprises at least one predefined kernel for a convolution operation as detailed above.

Indeed, the coefficients of the kernel have to be calibrated so that the kernel is general and can be applied to a wide variety of weed species. The coefficients of the kernel are determined on the basis of the training dataset. Once again, the coefficients of the kernel are determined on the basis of the features of the different weed species learned on the basis of the training dataset like the shape, the texture, the color and/or the location of the weed species in the images.

The images acquired by vehicle 1, also called training dataset, thus allow learning the features of the weed species to determine a set of weed identification model weights as well as coefficients of the kernel. This learning step is performed in order to maximize the accuracy of the model. The goal of this step is for instance to maximize the probability of predicting the weed samples tagged in the training in dataset. The set of model weights may be determined by using machine learning techniques, for instance by using gradient descent algorithms. The operations described above are performed on the images of the training dataset. The coefficients of the kernel initially used for performing the operations can be determined in different ways. For instance, the coefficients of the kernel can be randomly predefined. It is then possible to determine an error rate on the images on which the operations have been performed. Indeed, since the different weed species have been tagged on the images, it is possible to compare, for each weed species tagged, if the detection obtained by performing the operations is correct. If the error rate is not acceptable, for instance whether the error rate is higher than a predetermined threshold, a back-propagation learning can be performed to modify the set of weed identification model weights, hence the coefficients of the kernel. Obviously, after the first pass, significant modifications are necessary on the weed identification model weights, especially if these parameters have been randomly predefined. This step can obviously be repeated as often as necessary.

To summarize the above, the training dataset is used for a learning step during which the weights of the operations and the coefficients of the kernel are determined. Features like the shape, the texture, the color and/or the location of each weed species are automatically determined on the basis of the images of the training dataset in which a tagging operation has been performed to assign a category of weed for each sample. After performing the operations on the images of the training dataset, the accuracy of the model is estimated, with an error rate for instance, and a back-propagation learning is carried out to modify the weed identification model weights. This step of performing the operations and the back-propagation learning can be repeated so that the error rate obtained is reduced.

Finally, in a fourth step, the obtained set of weed identification model weights is stored in the memory module 14 of the weed control system 2 and can then be used for a weeding operation as detailed above.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions for execution by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A weed control system (2) for an agricultural sprayer (1), comprising:
    at least one camera (3) adapted to be mounted on an agricultural sprayer (1) to acquire an image of a portion of a crop field while said agricultural sprayer is travelling on a crop field, said image comprising a matrix of pixel values,
    a spraying unit (4) adapted to be mounted on said agricultural sprayer and comprising
        at least one supply module (8) comprising a chemical agent tank (11),
        at least one nozzle (9) to spray a chemical agent from said at least one supply module (8), and
        a controller module (10) adapted to receive a weed species detection signal and to selectively control the spraying of chemical agent from said at least one supply module though said at least one nozzle on the basis of said weed species detection signal,
    the weed control system (2) being characterized in that it further comprises:
    a weed species identification unit (5) comprising
        a communication module (13) adapted to receive the image acquired by the camera (3) and to send a weed species detection signal to a controller module (10) of a spraying unit (4) of the weed control system,
        a memory module (14) adapted to store said image, and
        a processing module (15) comprising a plurality of parallel processing cores (16),
        each parallel processing core (16) being adapted to perform at least one convolution operation between a sub-matrix constructed from nearby pixels of the image and a predefined kernel of reference pixel images stored in the memory module (14) to obtain a feature representation sub-matrix of the pixel values of the image,
        the processing module (15) being adapted to compute at least one probability of presence of a weed species among a database of weed species from a feature representation matrix of the image constructed from the feature representation sub-matrices constructed by the parallel processing cores, and to generate a weed species detection signal on the basis of said at least one probability of presence.

2. The weed control system according to claim 1, wherein a target zone (S) of the spraying unit (4) and a field of view (FOV) of the camera (3) are separated from one another by a separation distance $d_s$ along a longitudinal axis (X) of the agricultural sprayer (1),
    wherein the number of processing cores of the weed species identification unit (5) is such that a weed species detection signal can be generated from an image acquired by the camera (3) with a latency time value $t_l$ such that:

$$d_s/(t_l+t_p)>v$$

where v is a speed value of the agricultural sprayer (1) travelling on the crop field and $t_p$ is a processing time value of the spraying unit (4).

3. The weed control system according to claim 2, wherein the camera (3) has a longitudinal extension of the field of view $FOV_X$ along a longitudinal axis (X) of the agricultural sprayer (1) selected so that a weed species detection signal can be generated from an image acquired by the camera (3) with a latency time $t_l$, such that:

$$FOV_X/t_l>v$$

where v is a speed of the agricultural sprayer (1) travelling on the crop field.

4. The weed control system according to claim 1, wherein the camera (3) definition and the camera position on the agricultural sprayer (1) are selected such that each pixel of an image generated by said camera independently covers an elementary area of the ground area of less than five square millimetres.

5. The weed control system according to claim 1 wherein each parallel processing core (16) performs said at least one convolution operation by computing a matrix to matrix multiplication between the sub-matrix and a predefined kernel matrix, or by computing a Fast-Fourier-Transform of the sub-matrix, and wherein the parallel processing cores perform convolutions or Fast-Fourier-Transforms based on a given camera image at the same time.

6. The weed control system according to claim 1, wherein the parallel processing cores (16) of the processing module (15) are adapted to perform a pooling operation of the feature representation matrix of the image comprising determining a statistic of a sub-matrix of nearby values of said feature representation matrix, in particular a maximum of said sub-matrix of nearby values.

7. The weed control system according to claim 1, wherein the parallel processing cores (16) of the processing module (15) are adapted to perform a non-linear parallel processing of the feature representation matrix of the image by applying a non-linear operation to each value of said feature representation matrix, such as a rectified linear activation function.

8. The weed control system according to claim 1, wherein the processing module (15) is adapted to perform a sequence of n processing operations starting from an input matrix generated from the pixel values of the image and ending with an output matrix comprising at least one probability of presence of a weed species among a database of weed species, in particular wherein each processing operation i of said sequence of successive processing operations takes as input a feature representation matrix $F_{i-1}$ outputted by a preceding processing operation i−1 or an input matrix generated from the pixel values of the image, and generates a feature representation matrix $F_i$.

9. The weed control system according to claim 1, wherein the weed species detection signal comprises a weed species location indicator,
   in particular wherein the output matrix comprises at least one value indicative of a location of a weed species among the database of weed species inside the image acquired by the camera.

10. The weed control system according to claim 9, wherein a location of the weed species determined from the weed species location indicator is stored the memory module (14).

11. The weed control system according to claim 9, wherein the spraying unit (4) comprises a plurality of nozzles (9) arranged along a transversal direction (Y) of the agricultural sprayer (1), and
   wherein the controller module (10) of the spraying unit (4) is adapted to receive the weed species detection signal and to further control the spraying of chemical agent through the plurality of nozzles (9) based on the weed species location indicator.

12. The weed control system according to claim 9, wherein the spraying unit (4) comprises at least one movable nozzle (9) adapted to selectively spray a plurality of target zones along a transversal direction (Y) of the agricultural sprayer (1), and
   wherein the controller module (10) of the spraying unit (4) is adapted to receive the weed species detection signal and to further control a position and/or orientation of the movable nozzle (9) based on the weed species location indicator.

13. An agricultural sprayer (1) comprising a weed control system (2) according to claim 1 mounted on said agricultural sprayer.

14. A method for weed control using an agricultural sprayer (1) according to claim 13, comprising
   acquiring an image of a portion of a crop field while said agricultural sprayer (1) is travelling on a crop field, using at least one camera (3) mounted on the agricultural sprayer, said image comprising a matrix of pixel values,
   receiving the image acquired by the camera (3) in a communication module (13) of a weed species identification unit (5) of the agricultural sprayer and storing said image in a memory module (14) of said weed species identification unit,
   performing in parallel, in a plurality of respective parallel processing cores (16) of a processing module (15), a plurality of respective convolution operations, each convolution operation being performed between a sub-matrix constructed from nearby pixels of the image and a predefined kernel stored in the memory module (14) to obtain a feature representation sub-matrix of the pixel values of the image,
   computing at least one probability of presence of a weed species among a database of weed species from a feature representation matrix of the image constructed from the feature representation sub-matrices constructed by the parallel processing cores,
   generating a weed species detection signal on the basis of said at least one probability of presence a weed species and sending said weed species detection signal to a controller module of a spraying unit of the weed control system,
   receiving the weed species detection signal in a controller module (10) of a spraying unit (4) mounted on the agricultural sprayer (1), and
   selectively controlling the spraying of chemical agent from at least one supply modules (8) of the spraying unit (4) though at least one nozzle (9) on the basis of the weed species detection signal.

15. A method for calibrating a weed control system (2) according to claim 1, adapted to spray a plurality of weed species listed in a database of weed species, wherein
   a vehicle is provided with at least one camera (3) adapted to acquire an image of a portion of a crop field, during a movement of said vehicle (1) on a crop field, said image comprising a matrix of pixel values,
   said vehicle travels a crop field presenting at least a predefined number of each weed species of a database of target weed species, and acquires at least a predefined number of images of each weed species of said database of target weed species,
   a training dataset is constructed from said predefined number of images of each weed species by tagging said weed species on said images,
   a set of weed identification model weights is determined from the training dataset, said set comprising at least one predefined kernel for a convolution operation performed by a parallel processing core of a weed control system according to claim 1,
   the set of weed identification model weights is stored in a memory module of a weed control system (2) according to claim 1.

* * * * *